United States Patent
Kwak et al.

(10) Patent No.: US 8,466,876 B2
(45) Date of Patent: Jun. 18, 2013

(54) TERMINAL

(75) Inventors: Dong-ok Kwak, Suwon-si (KR); Eun-deok Bae, Suwon-si (KR); Dong-woo Lee, Seoul (KR); Ki-taek Kim, Yongin-si (KR); Seong-woon Booh, Yongin-si (KR); Jin-woo Cho, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1402 days.

(21) Appl. No.: 11/342,565

(22) Filed: Jan. 31, 2006

(65) Prior Publication Data

US 2006/0178176 A1 Aug. 10, 2006

(30) Foreign Application Priority Data

Feb. 4, 2005 (KR) .................................. 2005-10320

(51) Int. Cl.
*G06F 3/02* (2006.01)
*G09G 5/00* (2006.01)

(52) U.S. Cl.
USPC ........ 345/168; 345/156; 345/169; 455/575.1; 455/575.2; 455/575.3; 455/575.4; 361/679.3; 361/679.56

(58) Field of Classification Search
USPC .................. 345/90.3, 128, 347, 575.1–575.4, 345/156, 168, 169; 455/90.3, 128, 347, 575.1–575.4; 361/679.3, 679.56
See application file for complete search history.

(56) References Cited

U.S. PATENT DOCUMENTS

2005/0107137 A1* 5/2005 Byun et al. .................. 455/575.1
2005/0113154 A1* 5/2005 Park et al. ................... 455/575.4

FOREIGN PATENT DOCUMENTS

KR 1020040062765 A 7/2004
KR 1020040098618 A 11/2004

* cited by examiner

*Primary Examiner* — Lun-Yi Lao
*Assistant Examiner* — Insa Sadio
(74) *Attorney, Agent, or Firm* — Sughrue Mion, PLLC

(57) ABSTRACT

A terminal includes a lower housing; an upper housing slidably installed with respect to the lower housing; and a pressing member with both ends being supported by the lower and upper housings, respectively, for providing variable levels of pressure in diverse directions according to a sliding position of the upper housing with respect to the lower housing, wherein one end of the pressing member is movably linked to the lower housing. The small-sized pressing member provides a maximum level of pressure to facilitate the sliding movement of the upper housing with respect to the lower housing. Thus, space utilization can be improved.

12 Claims, 7 Drawing Sheets

TERMINAL

CROSS-REFERENCE TO RELATED APPLICATIONS

This application claims priority under 35 U.S.C. §119 from Korean Patent Application No. 2005-10320, filed Feb. 4, 2005, in the Korean Intellectual Property Office, the entire content of which is incorporated herein by reference.

BACKGROUND OF THE INVENTION

1. Field of the Invention

The present invention relates in general to a terminal, and more specifically, to a sliding-type terminal with a slidable upper housing against a lower housing.

2. Description of the Related Art

In general, a terminal is a device that allows a user to transmit/receive a signal with the other party. For example, cellular phones, PCS (personal communication service) phones or PDAs (personal digital assistants) are mobile communication terminals that enable a user to have wireless communication with a desired party while moving from one place to another.

Considering user's convenience and portability of the device, terminals can be classified into various types according to their appearance, e.g., bar-type, flip-type, folder-type and sliding-type terminals. In detail, this classification of mobile communication terminals is made according to the shape of a display panel for displaying signals and input keys for inputting signals.

The folder-type terminal has the display panel and the input keys in two separate housings, in which the housings are coupled to each other by a hinge in such a manner that one housing (i.e., the folder) can be rotated. Unlike the bar-type and flip-type terminals, the folder-type terminal can be made in small size and prevent malfunction problems caused by exposed input keys.

However, the problem with the folder-type terminal is that its display panel is open selectively according to the rotational position of the housing. Therefore, it is not easy for a user to check the content or message on the display panel. Although an auxiliary display panel can be mounted on the outside of the housing, this only complicates the structure and the auxiliary display panel is exposed to any type of damages caused by an external shock.

As an attempt to resolve the problems with the bar-type, flip-type and folder-type terminals, a sliding-type terminal was developed and is now widely used by many people. The sliding-type terminal is similar to the folder-type terminal in that the display panel and the input keys are formed in two separate housings. However, in case of the sliding-type terminal, both housings are slidable, and thus, the input keys are opened at the user's choice.

The sliding-type terminal includes an upper housing provided with a display panel being exposed to the outside all the time, and a lower housing provided with input keys being selectively opened (or exposed) by the sliding movement of the upper housing. Also, a pressing member is installed between the upper and the lower housing for limiting the sliding distance without the help of a separate stopper, and providing an elastic, pressing force to the sliding movement.

However, by the pressing member, tension is generated in the sliding direction and in the orthogonal direction to the sliding direction. Therefore, the upper and lower housings should be carefully designed considering the size of the pressing member and the range of tension. These impose restrictions on space utilization for the housings.

SUMMARY OF THE INVENTION

It is, therefore, an aspect of the present invention to provide a sliding-type terminal having an improved structure featuring high space utilization for upper and lower housings.

To achieve the above aspect, there is provided a terminal including: a lower housing; an upper housing slidably installed with respect to the lower housing; and a pressing member with both ends being supported by the lower and upper housings, respectively, for providing variable levels of pressure in diverse directions according to a sliding position of the upper housing with respect to the lower housing, wherein one end of the pressing member is movably linked to the lower housing.

The lower housing includes a guide unit for guiding one end of the pressing member.

In an exemplary embodiment, the guide unit includes a guide slit having a predetermined length and being formed at right angles to the sliding direction of the upper housing with respect to the lower housing.

The pressing member includes a torsion spring for providing a pressure while changing positions during the relative motion of the upper housing to the lower housing.

The pressing member is installed in such a manner to reverse a pressure in a predetermined section for the relative motion of the upper housing to the lower housing.

In an exemplary embodiment, one end of the pressing member is movable between a first position and a second position, and the pressing member is installed in such a manner that one end of the pressing member shifts to the first position as the other end of the pressing member moves to a section where the pressure is reversed (i.e., reverse section), and to the second position as the other end of the pressing member gets away from the reverse section.

The terminal further includes an auxiliary elastic member for pressing one end of the pressing member towards the second position.

The auxiliary elastic member includes a torsion spring which is installed in such a manner that one end is fixed onto the lower housing, whereas the other end is movably installed between the first and the second position to be able to press one end of the pressing member towards the second position.

The guide unit further includes a connecting member for connecting the other end of the auxiliary elastic member and one end of the pressing member, thereby allowing both ends to move together.

The upper housing is installed to slide upwards by a predetermined distance with respect to the lower housing.

The lower housing is provided with input keys in a predetermined area, and the upper housing is provided with a display panel in a predetermined area.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF EXEMPLARY EMBODIMENTS

An exemplary embodiment of the present invention will be described herein below with reference to the accompanying drawings.

Figure 1:
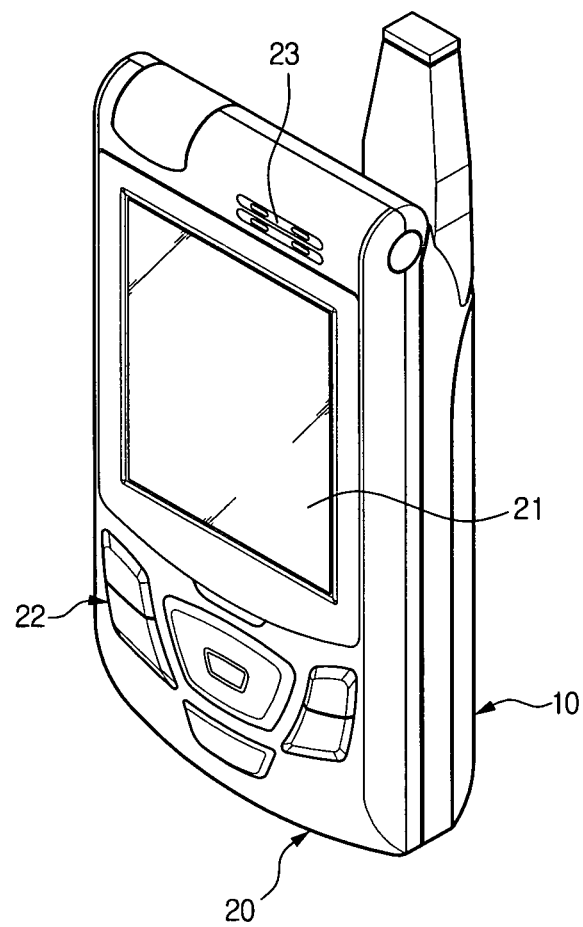
FIG. 1 is a perspective view of a terminal according to one embodiment of the present invention.
Figure 2:
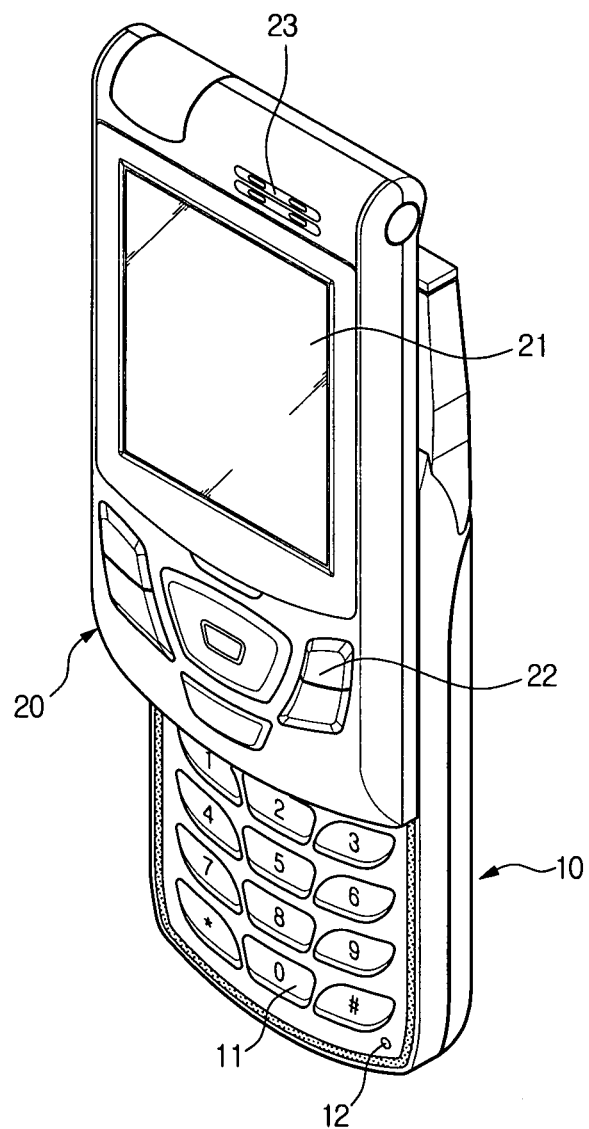
FIG. 2 is a perspective view of the terminal in FIG. 1, in which an upper housing is slid by a predetermined distance in the longitudinal direction of a lower housing.
Figure 3:
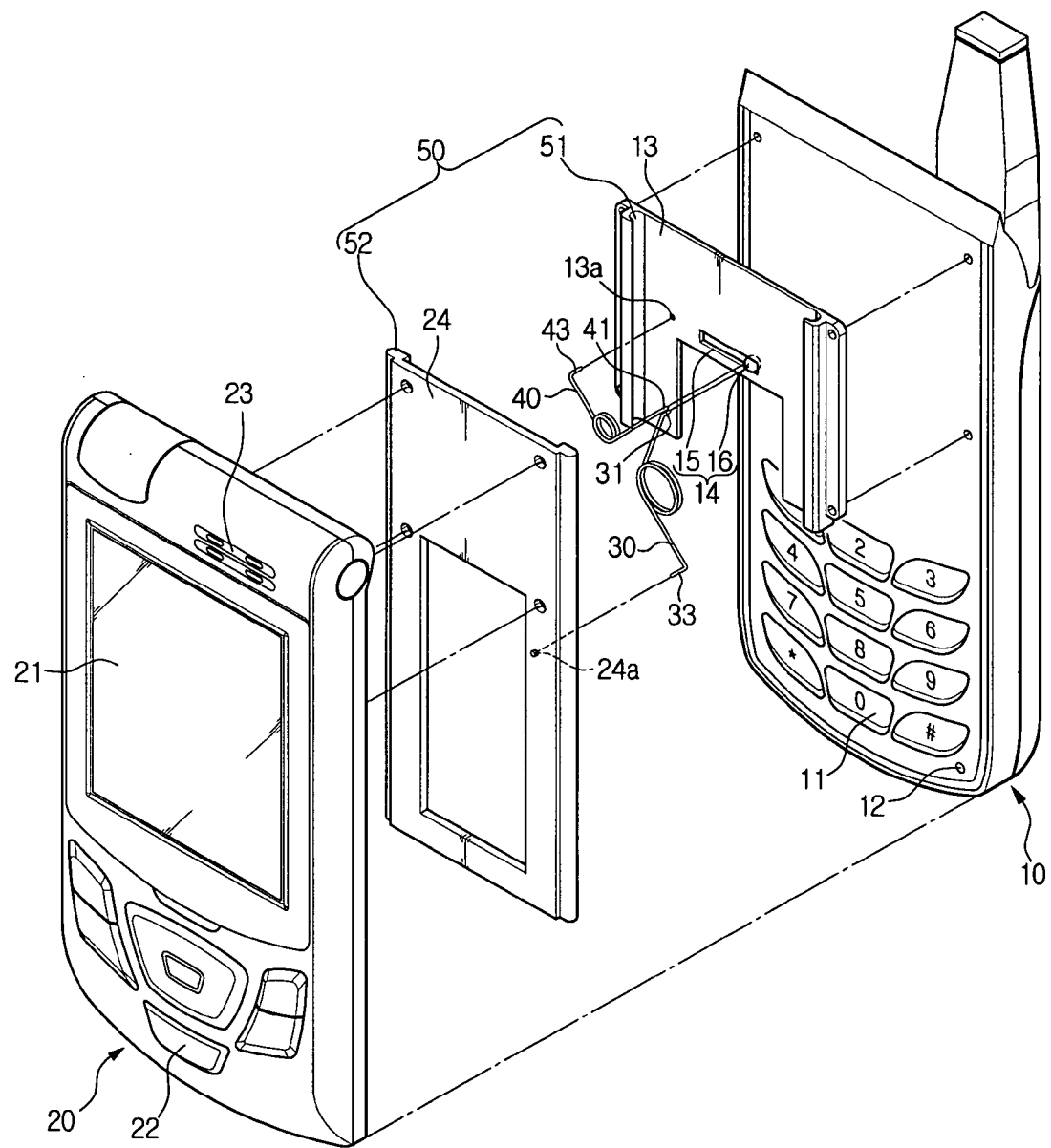
FIG. 3 is an exploded perspective view showing the assembly status of the terminal in FIG. 1.

As shown in FIGS. 1 to 3, a terminal of the present invention includes a lower housing 10, an upper housing 20, a pressing member 30, and an auxiliary elastic member 40.

The lower housing 10 is provided with input keys 11 for enabling a user to input signals, and a microphone unit 12 for transferring voice to the other party during phone call. The input keys 11 include a plurality of numeral keys (3×4 key buttons). As shown in FIG. 2, the input keys 11 and the microphone unit 12 mounted on the lower housing 10 can be selectively exposed to the outside according to the position of the upper housing 20.

Also, a lower plate 13 is installed above the input keys 11, being sandwiched between the upper and lower housings 20, 10. In effect, the lower plate 13 is never exposed to the outside because it is covered by the upper housing 20 all the time.

The lower plate 13 is provided with a guide unit 14 for guiding one end 31 of the pressing member 30. The guide unit 14 includes a guide slit 15 and a connecting member 16.

The guide slit 15 has a predetermined length and is formed at right angles to the sliding direction of the upper housing 20. The connecting member 16 connects the other end of the auxiliary elastic member 40 (to be described) with one end 31 of the pressing member 30, so that they can move together.

The upper housing 20 placed on the lower housing 10 includes a display panel 21, a menu input key 22, and a speaker phone unit 23 on its front surface.

The display panel 21 displays a predetermined signal. A color LCD module may be used as the display panel. Since the color LCD module is a well-known technology, it will not be necessary to give more details here.

The menu input key 22 is provided in the lower portion of the display panel 21, independently of the input keys 11 formed on the lower housing 10. Particularly, the menu input key 22 is used for menu selection, such as 'call', 'end' and 'confirm'. The speaker unit 23 is provided to transfer an audio signal from the other party.

An upper plate 24 is installed at the bottom surface of the upper housing 20 to face the lower plate 13. The upper plate 24 is interlocked with the slidable upper housing 20. Thus, the upper plate 24 is slidable with respect to the lower housing 10.

As aforementioned, the upper housing 20 is installed movably in the longitudinal direction of the lower housing 10. In detail, as shown in FIG. 2, the upper housing 20 slides upward by a predetermined distance from the lower housing 10. To this end, a sliding unit 50 is provided between the upper housing 20 and the lower housing 10.

Figure 4:
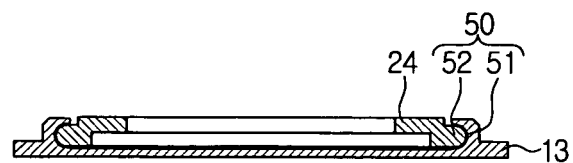
FIG. 4 is a cross-sectional view of a sliding unit of a terminal according to the present invention.

The sliding unit 50, as shown in FIGS. 3 and 4, includes a sliding groove 51 and a sliding member 52.

The sliding groove 51 is formed on the lower plate 13 in its longitudinal direction, that is, in the sliding direction of the upper plate 24 to the lower plate 13.

As shown in FIG. 4, the sliding groove 51 may be formed on both ends of the lower plate 13, but this is not mandatory. For instance, the sliding groove 51 can be formed at only one end of the lower plate 13, or can be protrusively formed from the lower plate 13.

Meanwhile, the sliding member 52 is formed on the upper plate 24 to be in correspondence to the sliding groove 51, so that it can be inserted into the sliding groove 51 and slides in the designated direction. As shown in FIG. 3, the sliding member 52, being one unit of the upper plate 24, has a bar shape and its ends on both sides have round cross sections. However, this is provided for illustrative purposes only, and the present invention is not limited thereto. In effect, the sliding member 52 may have a projection shape as long as it can be movably installed in the sliding groove 51.

The pressing member 30 is supported by the upper and lower housings 20, 10, respectively. To be more specific, both ends of the pressing member 30 are supported by the upper and lower plates, respectively.

The pressing member 30 provides a variable pressure according to the movement of the upper housing 20 with respect to the lower housing 10. In other words, the pressing member 30 provides different levels of pressure depending on the sliding position of the upper housing 20. To this end, a torsion spring may be used as shown in FIGS. 5 to 8. The torsion spring provides variable pressure while changing its position. However, the torsion spring is not the only option for the technical constitution of the pressing member. In effect, any type of elastic means that can provide different levels of pressure in various directions from a given position can be utilized as the pressing member 30.

The pressing member 30 is installed in such a manner that its one end 31 can move along the guide slit 15 of the lower plate 13 formed on the lower housing 10. In addition, the other end 33 of the pressing member 30 is inserted into a fixed groove 24a of the upper plate 24 formed on the upper housing 20.

Figure 5:
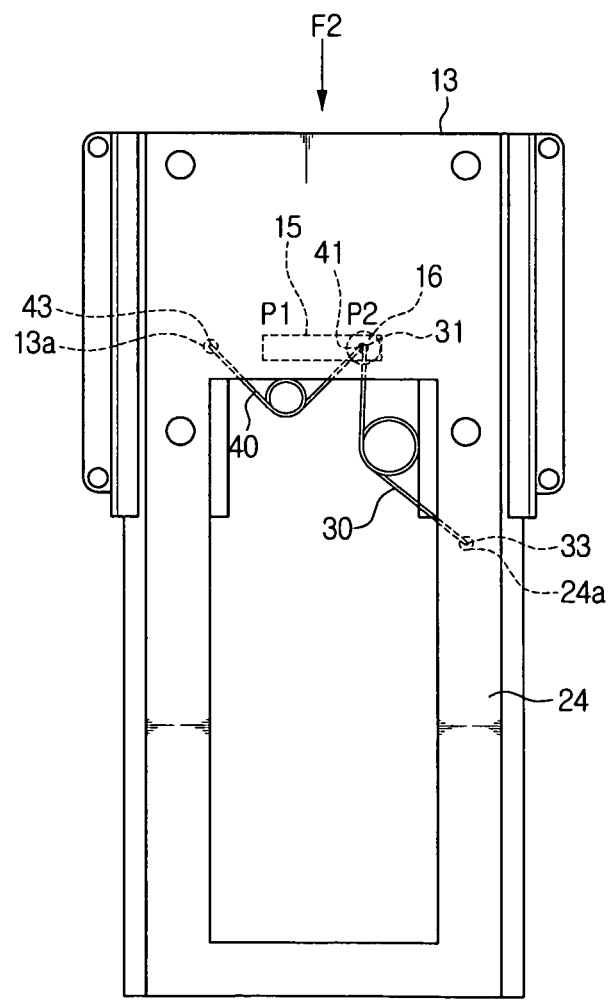
FIG. 5 to FIG. 7 are plan views for explaining the operation status of a terminal according to the present invention.
Figure 6:
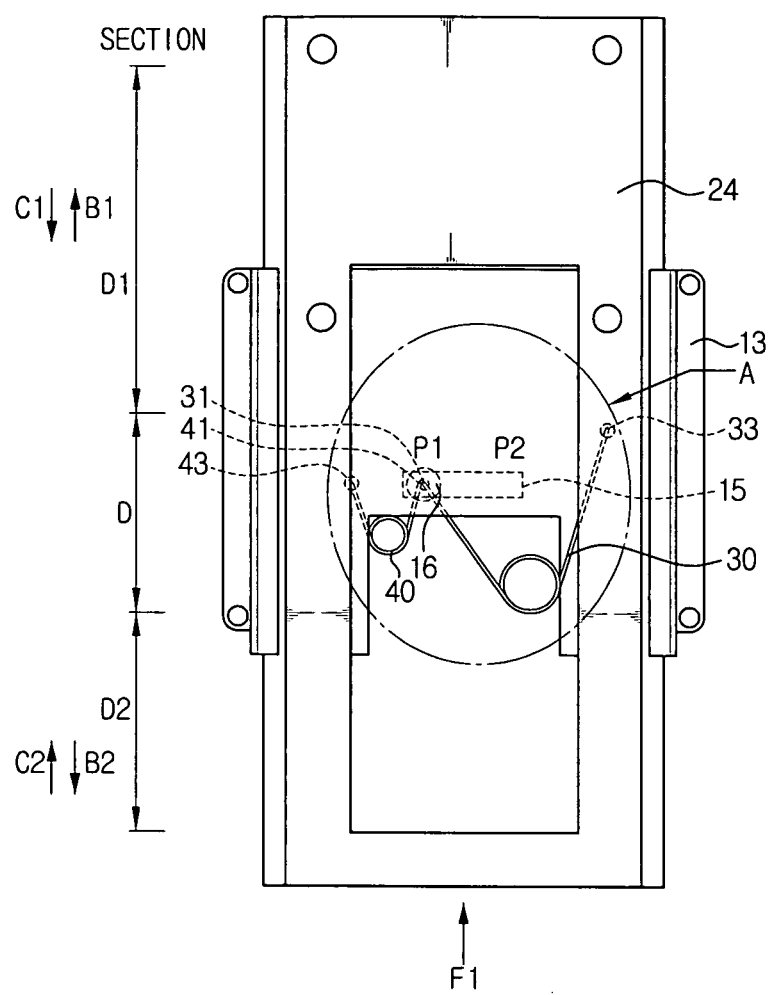
Figure 7:
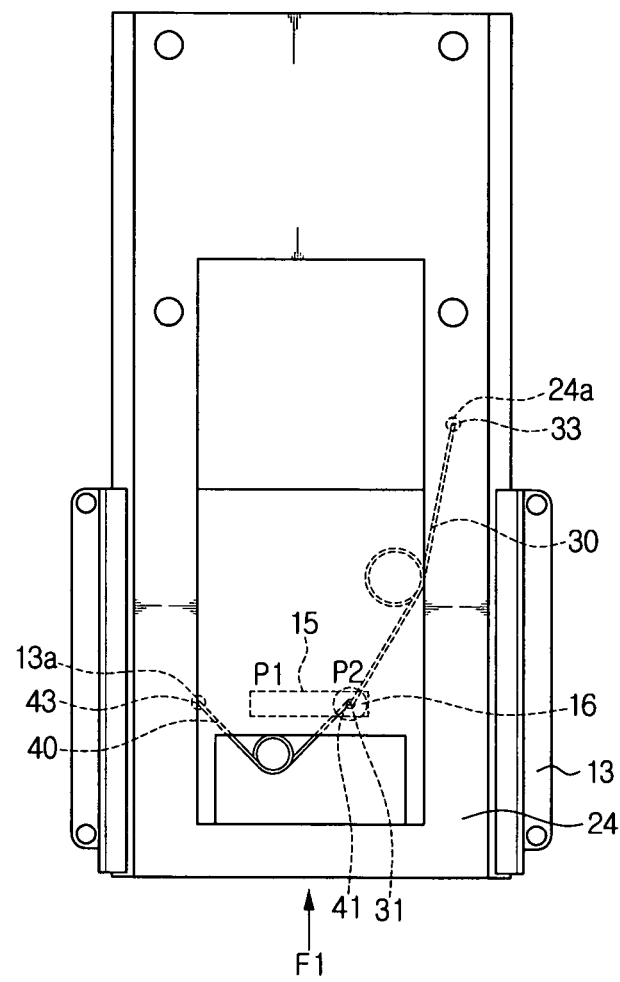

Meanwhile, the pressure of the pressing member 30 is reversed in a predetermined section during the relative movement of the upper housing 20 to the lower housing 10. In detail, one end 31 of the pressing member 30 moves between a first and a second position $P_1$, $P_2$, as depicted in FIGS. 5 and 7. Here, as shown in FIG. 6, the first position $P_1$ is a place where one end 31 of the pressing member 30 shifts as the other end 33 of the pressing member 30 shifts to the section D (reverse section) in which the pressure is reversed.

In like manner, the second position $P_2$ is a place where one end 31 of the pressing member 30 shifts as the other end 33 of the pressing member 30 goes away from the reverse section D. When one end 31 of the pressing member 30 is located at the second position $P_2$, the other end 33 of the pressing member 30 is located at the point $A_1$ of the section $D_1$ (open section) where the lower housing 10 is exposed (opened) to the outside, or at the point $A_2$ of the closed section $D_2$ where the lower housing 10 is covered (closed) by the upper housing 20.

To press one end of the pressing member 30 towards the second position $P_2$, one end 43 of the auxiliary elastic member 40 is inserted into a support groove 13a of the lower plate 13 formed at the lower housing 10. Also, the other end of the auxiliary elastic member 40, together with one end 31 of the pressing member 30, is connected to the connecting member 16, so that it can move for a predetermined distance along the guide slit 15.

While moving between the first position $P_1$ and the second position $P_2$ along the guide slit 15, the other end 41 of the auxiliary elastic member 40 presses one end 31 of the pressing member 30 towards the second position $P_2$.

Similar to the pressing member 30, the auxiliary elastic member 40 can be formed of a torsion spring. Again, this is not a requirement. For instance, any conventional spring, such as a compression spring, can be used as long as it can press one end 31 of the pressing member 30.

The following will now explain the operation of the terminal according to the present invention.

Figure 8:
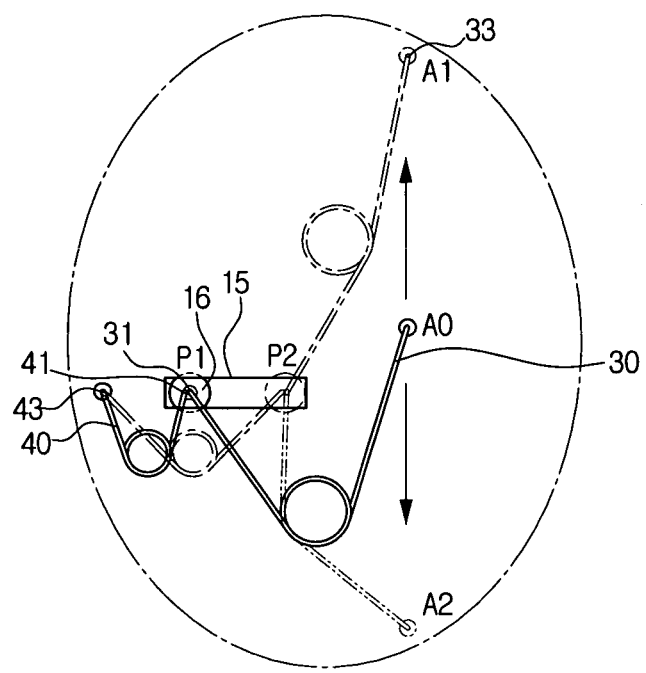
FIG. 8 is an enlarged view of area A of FIG. 6.

As shown in FIGS. 1 and 5, when the lower housing 10 is fully covered by the upper housing 20 of the terminal, the other end 33 of the pressing member 30 is located at the point $A_2$ in FIG. 8. That is to say, the pressing member 30 is positioned in the closed section $D_2$ in FIG. 6 while providing a pressure in the $B_2$ direction. Moreover, one end 31 of the pressing member 30 and the other end 41 of the auxiliary elastic member 40, being connected to each other by the connecting member 16, are located at the second position $P_2$.

As shown in FIGS. 6 and 8, when the user slides the upper housing 20 upward, i.e., in the $F_1$ direction, by a predetermined distance, the other end 33 of the pressing member 30 is shifted to the point $A_0$ in the reverse section D by the pressure in the $C_2$ direction.

Moreover, one end 31 of the pressing member 30 and the other end 41 of the auxiliary elastic member 40 move along the guide slit 15 until they reach the first position $P_1$. Here, the pressure from the pressing member 30 is reversed in the $B_1$ or $B_2$ direction, depending on the direction of the force provided by the user.

As shown in FIGS. 7 and 8, when the upper housing 20 keeps sliding upwards in the $F_1$ direction from the closed status in FIG. 6, the pressure from the pressing member 30 is reversed in the $B_1$ direction and thus, the other end 33 of the pressing member 30 shifts to the $D_1$ section where the lower housing 10 is exposed to the outside.

Once the other end 33 of the pressing member 30 shifts from the reverse section D to the open section $D_1$, the upper housing 20 automatically slides up to the point $A_1$ by the reversed pressure from the pressing member 30. That is, by the pressure from the pressing member 30, the terminal is semi-automatically opened.

Also, one end 31 of the pressing member 30, being pressed by the auxiliary elastic member 40, moves along the guide slit 15 until it reaches the second position $P_2$. In this manner, the upper housing 20 slides up with respect to the lower housing 10, and the user is able to use the input keys 11 and the microphone unit 12 mounted on the lower housing 10 to operate the functions of the terminal, including data search or signal exchange with the other party.

Meanwhile, if the user wants to return the lower housing 10 to its closed status, he(she) needs to pull the upper housing 20 down in $F_2$ direction as shown in FIG. 5. At this time, the other end 33 of the pressing member 30 provides a pressure in $C_1$ direction to get away from the open section $D_1$. As such, both ends 31, 33 of the passing member 30 return to the reserve section D, and are located at the first position $P_1$ and the point $A_0$, respectively.

When the user keeps pulling the upper housing 20 down in $F_2$ direction, the upper housing 20 keeps sliding down until it fully covers the lower housing 10. At this time, one end 31 of the pressing member 30 returns to the second position $P_2$ being pressed by the auxiliary elastic member 40, and the other end 33 of the pressing member 30 shifts to the point $A_2$ after being pressed in $B_2$ direction. Once the other end 33 of the pressing member 30 gets away from the reverse section D and enters the close section $D_2$, the upper housing 20 semi-automatically returns to its initial position by the pressure from the pressing member 30 in $B_2$ direction, so the user does not need to keep pulling the upper housing 20 to the end.

Accordingly, since the small-sized pressing member 30 provides a maximum level of pressure to facilitate the sliding movement of the upper housing 20 with respect to the lower housing 10, space utilization can be improved.

Also, according to the terminal of the present invention, since one end of the pressing member between the upper and lower housings is movably installed by the guide unit, the upper housing can be free from the influence of the reverse force that is applied at right angles to the sliding direction of the upper housing. In this way, the pressure from the pressing member guarantees a maximum sliding distance to the upper housing.

In other words, even though the pressing member is small in size, it can elastically support the sliding movement of the upper housing of the terminal, providing a maximum pressure thereto. In this manner, space utilization of the terminal can be improved.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A terminal comprising:
a lower housing;
an upper housing slidably installed with respect to the lower housing; and
a pressing member that is configured, so that one end thereof is linked to the lower housing to be shiftable in whole with respect to the lower housing when the upper housing is slid with respect to the lower housing and elastically urged in a first direction and the other end thereof is supported by the upper housing and elastically urged in a second direction opposite to the first direction, for providing variable levels of pressure in diverse directions according to a sliding position of the upper housing with respect to the lower housing,
wherein the one end of the pressing member comprises an unfixed free end.

2. The terminal according to claim 1, wherein the lower housing comprises a guide unit for guiding the one end of the pressing member.

3. The terminal according to claim 2, wherein the guide unit comprises a guide slit having a predetermined length and being formed at right angles to the sliding direction of the upper housing with respect to the lower housing.

4. The terminal according to claim 3, wherein the pressing member is installed in such a manner to reverse a pressure in a predetermined section for the relative motion of the upper housing to the lower housing.

5. The terminal according to claim 4, wherein the one end of the pressing member is movable between a first position and a second position, and the pressing member is installed in such a manner that the one end of the pressing member shifts to the first position as an other end of the pressing member moves to a reverse section, where the pressure is reversed, and to the second position as the other end of the pressing member gets away from the reverse section.

6. The terminal according to claim 5, further comprising:
an auxiliary elastic member for pressing the one end of the pressing member towards the second position.

7. The terminal according to claim 6, wherein the auxiliary elastic member comprises a torsion spring installed in such a manner that one end thereof is fixed onto the lower housing, whereas an other end is movably installed between the first and the second position to be able to press the one end of the pressing member towards the second position.

8. The terminal according to claim 7, wherein the guide unit further comprises a connecting member for connecting the other end of the auxiliary elastic member and the one end of the pressing member, thereby allowing both ends to move together.

9. The terminal according to claim 1, wherein the pressing member comprises a torsion spring for providing a pressure while changing positions during the relative motion of the upper housing to the lower housing.

10. The terminal according to claim 1, further comprising:
   an auxiliary elastic member for pressing the one end of the pressing member tightly in one direction.

11. The terminal according to claim 1, wherein the upper housing is installed to slide upwards by a predetermined distance with respect to the lower housing.

12. The terminal according to claim 1, wherein the lower housing is provided with input keys in a predetermined area, and the upper housing is provided with a display panel in a predetermined area.

* * * * *